United States Patent [19]

Edwall

[11] Patent Number: 5,452,075

[45] Date of Patent: Sep. 19, 1995

[54] METHOD AND DEVICE FOR MONITORING BRANCHED OPTICAL LINE NETWORK

[75] Inventor: Nils E. G. Edwall, Stockholm, Sweden

[73] Assignee: Telefonaktiebolaget LM Ericsson, Stockholm, Sweden

[21] Appl. No.: 354,145

[22] Filed: Dec. 6, 1994

Related U.S. Application Data

[63] Continuation of Ser. No. 84,176, Jul. 1, 1993, abandoned.

[30] Foreign Application Priority Data

Jul. 3, 1992 [SE] Sweden .................... 9202112

[51] Int. Cl.[6] ............................................. G01N 21/88
[52] U.S. Cl. ................... 356/73.1; 250/227.15
[58] Field of Search .............. 356/73.1; 250/227.15

[56] References Cited

U.S. PATENT DOCUMENTS 4,397,551  8/1983  Bage et al. ....................... 356/73.1
5,077,729  12/1991  Wong ............................... 359/110
5,187,362  2/1993  Keeble ........................... 356/73.1 X

FOREIGN PATENT DOCUMENTS 0365371  4/1990  European Pat. Off. .
 367073  5/1990  European Pat. Off. .
0493132  7/1992  European Pat. Off. .
3735291  12/1990  Germany .
WO92/10887  6/1992  WIPO .

*Primary Examiner*—Vincent P. McGraw
*Attorney, Agent, or Firm*—Burns, Doane, Swecker & Mathis

[57] ABSTRACT

A method for monitoring branched optical line networks, adapted for transferring information signals via one or more branchings between an information source and an information receiver. The information signal is fed to a first in-gate to its respective branching and that a monitoring signal is fed into a second in-gate to its respective branching and that the branching connects the information signal and the monitoring signal to a first as well as to a second out-gate of the branching.

2 Claims, 2 Drawing Sheets

METHOD AND DEVICE FOR MONITORING BRANCHED OPTICAL LINE NETWORK

This application is a continuation of application No. 08/084,176, filed Jul. 1, 1993, now abandoned.

TECHNICAL FIELD

The present invention relates to a method for monitoring branched optical line networks.

The present invention also relates to a device for monitoring branched optical line networks.

STATE OF THE ART

Optical lines are in an ever growing extent replacing electrical lines in more and more fields, such as in telecommunication technology and to a certain extent also in control and measurement technology. Optical lines have reached their widest spread as a transmission medium in the so called transportation network for telecommunications, i.e., those parts of a network that connects telephone switches to each other on an international and a national level as well as in densely populated areas. What attracts the greatest interest is to connect end-users to the closest switch by way of optical lines, and particularly by way of optical fibers. In order to obtain the best possible overall economy, various solutions have been studied, in which ordinary telephony and cable-TV are combined in the same opto-fibre network for the end-user. These distribution networks are intended to be passive so that components do not need to be supplied with current between the switch station and the end-user.

In order to divide the traffic signal, it is required that the network contains several branchings. A known type of branching component is the so called 1:n-connector (n=multiple of 2). This has an in-gate and two or more out-gates. The in-gate is thereby used for feeding in the information signal, which in the connector is branched to for example, cascade-coupled, subsequent branchings in a sufficient number of stages to obtain a number of out-gates in the last stage corresponding to the number of end-users.

Maintenance and monitoring of the optical network constitutes an important question in comparison with the electrical line networks. In order to offer good overall economy, the monitoring could be centrally carried out, for example, in a telephone switch station. Home-calls to several end-users or dependency on failure reports from end-users should be avoided to the largest possible extent.

In so called interactive networks, for example telephone networks, whereby directed traffic, i.e., traffic both to and from end-users occur, there are simple solutions for failure monitoring, as proposed, for example, in the U.S. Pat. Nos. 5,077,729 and 4,397,551 and European patent publication No. 0 365 371. These known methods are based on sending out monitoring signals from the station that later use the transmitter of the return channel or return lines to regain a monitoring signal unique for every end-user. This means that one uniquely isolates any failures on the way to a subscriber from the station-end without the subscribers active co-operation.

In so called distributive networks, where only a one-directed traffic exists, this option is not available. A return channel unique for every subscriber does not exist as a consequence of the way these networks are normally built, i.e., by pure branching, with 1:n-connector components. At the station-end, it is impossible to connect into a unique subscribers line without interrupting the transmission to him. For optical distributive line networks, no methods for operational monitoring are known so far. A known monitoring method is the radar-like measurement method optical-time-domain-reflectrometry (OTDR). This is based on a very short pulse of light being sent out in a fiber. Joints, breakages, fiber-defects or other changes in the characteristics of the transmission channel gives rise to variations in the reflected signal, which are spread back and wave-lead by the fiber back to the transmitter. The time it takes for such a reflection to return gives an indication of where the failure is located. This method thus meets the basic requirements that measurement can be carried out from the station-end. Several variants of the ODTR method are also known. There exists, for example, optical-frequency-domain-reflectrometry (OFDR) and variants using two or more wavelengths of both OTDR and OFDR. These methods are, for example, described in the U.S. Pat. No. 4,397,551.

The problem with using OTDR type methods on conventional branched optical networks is that one can not unambiguosly determine which of the branches is faulty, nor is it possible to connect the monitoring device at the station end without disturbing or interrupting the distribution to subscribers who have no failures on their lines.

The object of the present invention is to enable to monitoring, of the operational state in a branched optical line network and to indicate the branch, in which an abnormal operational state exists.

SUMMARY OF THE INVENTION

Said object is achieved by providing a method for monitoring branched optical line networks according to the present invention.

Said object is also achieved by providing a device for monitoring branched optical line networks according to the present invention.

BRIEF DESCRIPTION OF FIGURES

The invention will henceforth be described in greater detail by way of example only in an embodiment with reference to the accompanying drawings, in which.

DESCRIPTION OF A PREFERRED EMBODIMENT

Figure 1:
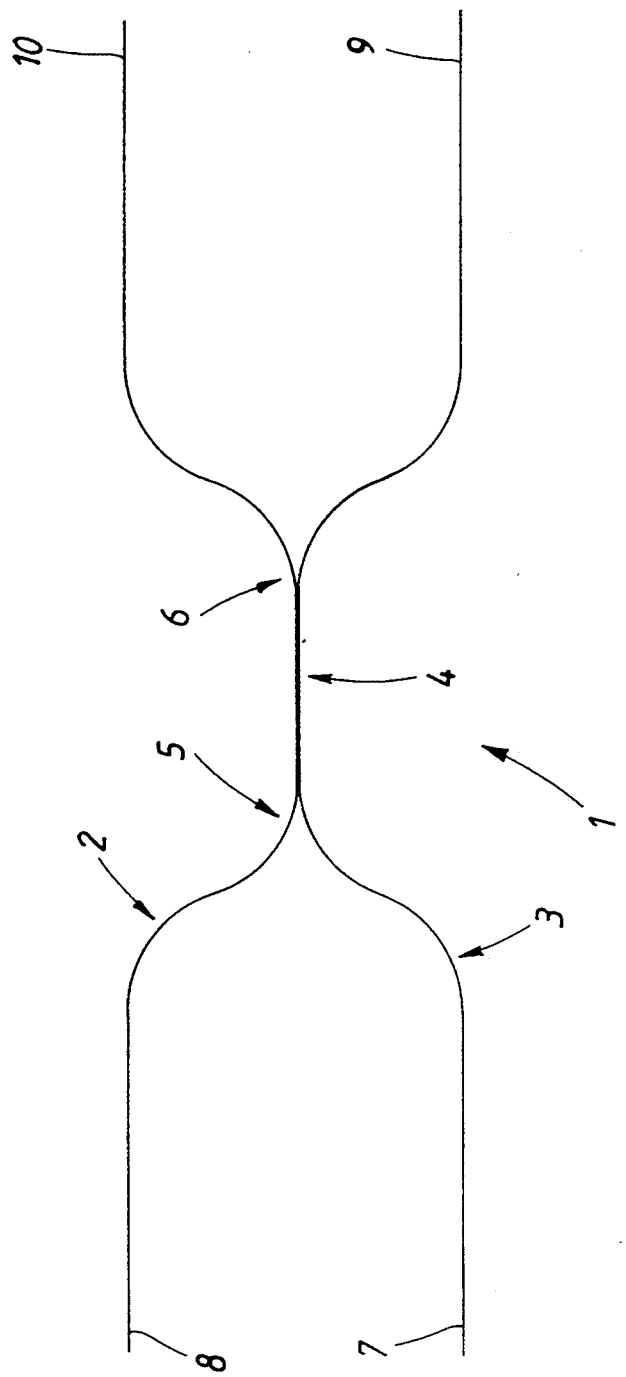
FIG. 1 diagrammatically shows a branching element according to the present invention and FIG. 2 shows an example of part of a branched optical line network according to the invention.

The basic components in the method and device according to the present invention is the branching element 1, which by way of an example is shown in FIG. 1. The element 1 advantageously consists of optical fiber lines, so called opto-fibers 2, 3, that according to the illustrated example are two in number and connected to each other at a connection location 4, whereby double branches are created, namely an in-branch 5 on an inlet side of the branching element or connector element and an out-branch 6 on an outlet side of the connector element. Hereby, a number of in-gates 7, 8 and out-gates 9, 10 are created, which in the illustrated examples amounts to two in-gates and two out-gates. The connector element 1 according to the present invention is of a melted fiber connector type. This type of conductor is manufactured in a glass blowing-like process, in which two so called signal mode opto-fibers are melted together under highly controlled length- and proximity circumstances so that the connector location 4 and the in-branch 5 and out-branch 6 are formed with a high degree of symmetry and minimal light effect losses.

Figure 2:
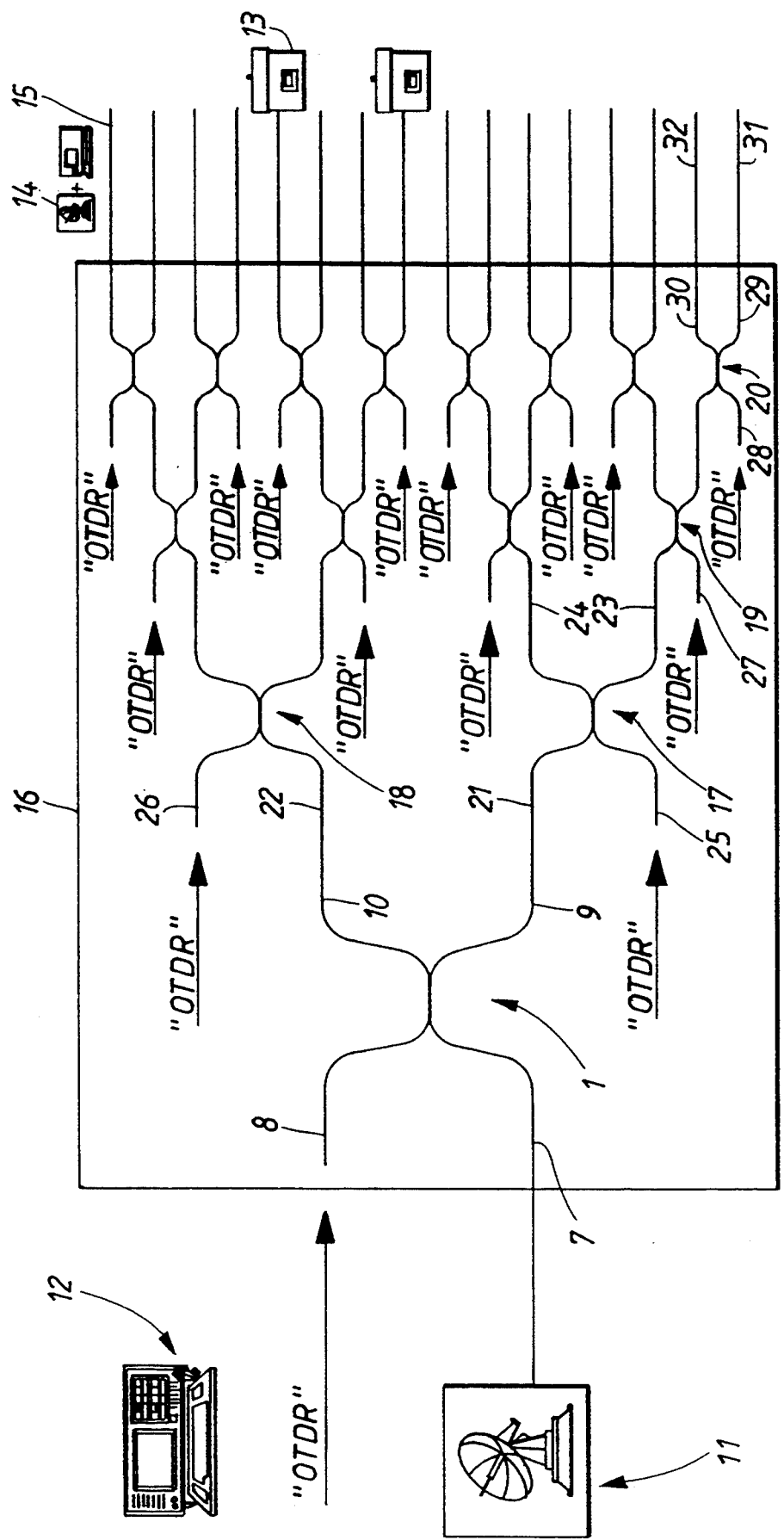

As can be seen in FIG. 2, one of the in-gates 7 to a first connector element 1 is according to the present invention connected to an information source 11, which may be a primary information source or a link in an information system, for example, with wireless links for long distance distribution. The in-gate is continually fed with an optical information signal for distribution to the end-users via a tree-like branching structure. The second in-gate 8 in the first connector 1 is according to the present invention connected to a monitoring device 12 for operational monitoring of the branched optical line network according to the present invention. The monitoring device may, for example, be of the OTDR/OFDR type, which as was mentioned initially, utilizes the radar-like measurement method of optical-time-domain-reflectomitry, or alternatively optical-frequency-domain-reflectrometry or other variants using two or more wavelengths of both OTDR and OFDR. These are thus based on that an optical monitoring signal is fed in via the second in-gate 8 of the first connector element 1, whereby any reflections arising upon a failure somewhere in the branching network, are detected and received by the monitoring device 12 in the shape of a reflected monitoring signal. According to prior art, the distance to the location of failure can be determined by measuring the time or frequency of the reflected monitoring signal relative to the transmitted optical monitoring signal. At the connector location 4, connections are made in such a way, that both the information signal and the monitoring signal appear at both out-gates, and the signals are then further branched in the network.

For each particular network, several outgoing opto-fiber lines 15 are required to each end-user 13 or for further transmission from a linking station 14 or the like, which is achieved by cascade-coupling the connector elements in a sufficient number of stages. This cascade-coupling is suitably made as concentrated as possible and preferably in a connector or switch station 16, which facilitates the operational monitoring. The cascade-coupling is selected in such a way according to the present invention, that both out-gates 9, 10 in all connecter elements 1, 17, 18, 19, 20 are connected only to the first in-gate 21, 22, 23, 24 in a respective connector element 17, 18, 19, 20, which is cascade-coupled to the connector element in the previous stage. The second in-gate 25, 26, 27, 28 is thus not connected to the information source 11, but is only intended for connection to the monitoring device 12 for receiving the optical monitoring signal in order to determine abnormal operational states and to locate the fault according to the method described below.

The continuous monitoring of the entire optical line network beginning with the first connector element 1, is carried out by the connection of the monitoring device to the second in-gate 8 in the first connector element by feeding the optical monitoring signal in via the in-gate 8 without hindrance and feeding the information signal into the connector element via the first in-gate and further distributing it through all connector elements and to the end-users 13. When the monitoring device 12 obtains an indication of an abnormal state in the line network, no information is obtained via the in-gate 8 about in which branch the abnormal state has arisen. The indication may, as mentioned above, be of a type known per se, whose form depends on the choice of measurement method. The indication obtainable from the in-gate 8 is mainly the line-distance from the measurement location.

The abnormal state or failure is tracked by successively moving the connection of the monitoring device 12 to a connector element located further on in the tree-like connector structure, whereby one connects the monitoring device to the special second in-gate, which thus constitutes a monitoring in-gate, which is carried out at one connector element at a time. One thereby, for example, connects the monitoring device to the monitoring in-gate 25 in the connector element 17 and if no failure-indication is obtained, the connection is transferred to the monitoring in-gate 26 in the connector element 18. If no failure-indication is given here either, the failure can thus be tracked to the first connector element 1. If, however, a failure indication is obtained at the monitoring in-gate 26, one moves on to the next stage in the cascade-coupling and connects for example, to the in-gate 27 in the connector element 19. If, whereby a failure indication arises at the in-gate 27, one directly moves over to the subsequent stage and, for example, connects the monitoring device to the in-gate 28 in the connector element.

In the last stage of the cascade-coupling, uncertainty remains about in which of the last two branches the failure lies, i.e., on the branch belonging to the out-gate 29 or the out-gate 30, or its subsequent line 31, 32 to the end-user. This is solved by utilizing the connection degree of a connector element, which in the illustrated example is of the direction coupler-type depends on the wavelength. The monitoring is made by measuring the reflected monitoring signal at two monitoring wavelengths, chosen in such a way, that the connection degrees in the included cascaded connector elements, are different.

The invention is not limited to the embodiment described above and in the drawings, but may be varied within the scope of the accompanying claims. For example, a structure having 16 out-gates is shown, which is a common form for cable-TV, but it is to be understood the number of out-gates can be much varied. In essence, it is sufficient to use only one connector element 1. Furthermore each connector element may consists of more than two in-gates and out-gates, whereby the number of in-gates and out-gates in each connector element preferably is the same. This may for example be achieved by having several signal mode opto-fibres melted together in the connector location. Hereby one of the in-gates in each element is used for monitoring purposes.

I claim:

1. A method for monitoring branched optical line networks, adapted for transferring information signals via one or more branchings between an information source and an information receiver, comprising the steps of:

feeding the information signal to a first in-gate of at least one branching;

feeding a monitoring signal into a second in-gate of said at least one branching, wherein the branching connects the information signal and the monitoring signal to a first and second out-gate of the branching;

cascade-coupling a plurality of branchings in such a way that the first information signal is connected via the first in-gate and both out-gates of each branching to the first in-gate of each subsequent branching;

connecting the monitoring signal via the second in-gate and both out-gates of each branching to the first in-gate of each subsequent branching;

monitoring the entire line network in the feed direction of the information signal from the first branching with the monitoring signal; and transferring the monitoring signal upon a detected abnormal state in the line network to the second in-gate of each subsequent branching in which an abnormal state has been detected.

2. A device for monitoring branched optical line networks, adapted for transferring information signals via one or more branchings between an information source and an information receiver and comprising a monitoring device connected to the line networks, said branchings consists of at least two in-gates and at least two out-gates, and at least one of the in-gates is connected for receiving the information signal and the second in-gate is connected for receiving a monitoring signal from the monitoring device and the branchings are adapted to connect the in-gates to the out-gates so that both the information signal and the fed monitoring signal are transferred to the first as well as to the second out-gate, wherein a plurality of branchings are cascade-coupled in such a way, that the out-gates from each branching are connected to an in-gate of subsequent branchings, subsequent branching being connected in cascade after the first branching, while a second in-gate of each branching is connectable to the monitoring device.

* * * * *